(12) United States Patent
Welch et al.

(10) Patent No.: US 11,889,153 B2
(45) Date of Patent: Jan. 30, 2024

(54) SYSTEM AND METHOD FOR INTEGRATION OF AUTOMATIC RESPONSE GENERATING SYSTEMS WITH NON-API APPLICATIONS

(71) Applicant: BANK OF AMERICA CORPORATION, Charlotte, NC (US)

(72) Inventors: Donna Maria Welch, Bluffton, SC (US); Sudhakar Balu, Chennai (IN); Srinivasa Dhanwada, Hyderabad (IN); Siva Kumar Paini, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/741,854

(22) Filed: May 11, 2022

(65) Prior Publication Data

US 2023/0370681 A1 Nov. 16, 2023

(51) Int. Cl.
| | |
|---|---|
| *H04N 21/472* | (2011.01) |
| *H04N 21/443* | (2011.01) |
| *H04L 51/02* | (2022.01) |
| *H04L 67/63* | (2022.01) |
| *H04L 49/90* | (2022.01) |
| *G06F 16/951* | (2019.01) |
| *G06F 40/30* | (2020.01) |

(52) U.S. Cl.
CPC ....... *H04N 21/47202* (2013.01); *H04L 51/02* (2013.01); *H04L 67/63* (2022.05); *H04N 21/4431* (2013.01); *H04N 21/47217* (2013.01); *G06F 16/951* (2019.01); *G06F 40/30* (2020.01); *H04L 49/90* (2013.01)

(58) Field of Classification Search
CPC ............ G06Q 10/06316; G06F 16/951; G06F 16/164; G06F 40/30
See application file for complete search history.

(56) References Cited

U.S. PATENT DOCUMENTS

| 8,708,791 B2 | 4/2014 | Nguyen et al. |
| 8,738,739 B2 | 5/2014 | Makar et al. |

(Continued)

OTHER PUBLICATIONS

Welch, et al; System and Method for Intelligently Generating Code for Use in Integrating Automated Response Generating Systems With Non-API Applications; U.S. Appl. No. 17/741,953, filed May 11, 2022.

(Continued)

*Primary Examiner* — Barbara B Anyan (57) ABSTRACT

A system includes a memory and a processor. The memory stores a set of videos each of which is associated with an application of a set of applications and depicts a process performed using the application. For each video, the processor generates metadata associated with the depicted process, and stores the metadata within a collection of metadata in the memory. The processor receives a request for information from a user. In response, the processor identifies an application of the set of applications for use in generating a response to the request. The processor generates, based on the collection of metadata, instructions for interfacing with the first application to generate the response. The processor executes the instructions to interface with the first application to generate the response, and transmits the response to the user.

20 Claims, 5 Drawing Sheets

(56) References Cited

U.S. PATENT DOCUMENTS

| | | |
|---|---|---|
| 9,294,502 B1 | 3/2016 | Benishti |
| 9,626,677 B2 | 4/2017 | Turgeman et al. |
| 9,680,850 B2 | 6/2017 | Rapaport et al. |
| 9,794,199 B2 | 10/2017 | Capper et al. |
| 9,848,009 B2 | 12/2017 | Turgeman et al. |
| 9,947,319 B1 | 4/2018 | Horling et al. |
| 10,013,980 B2 | 7/2018 | Borsutsky et al. |
| 10,069,852 B2 | 9/2018 | Turgeman et al. |
| 10,116,596 B2 | 10/2018 | Li et al. |
| 10,187,337 B2 | 1/2019 | Smullen et al. |
| 10,200,384 B1 | 2/2019 | Mushtaq et al. |
| 10,229,203 B2 | 3/2019 | Li et al. |
| 10,372,508 B2 | 8/2019 | Hosabettu et al. |
| 10,389,745 B2 | 8/2019 | Mueen et al. |
| 10,498,898 B2 | 12/2019 | Mazza et al. |
| 10,565,634 B2 | 2/2020 | Talmor et al. |
| 10,581,765 B2 | 3/2020 | Koukoumidis et al. |
| 10,582,057 B2 | 3/2020 | Konig et al. |
| 10,599,885 B2 | 3/2020 | Galitsky |
| 10,635,752 B2 | 4/2020 | Zhou et al. |
| 10,645,034 B2 | 5/2020 | Lalji et al. |
| 10,679,631 B2 | 6/2020 | Hirzel et al. |
| 10,757,044 B2 | 8/2020 | Fawcett |
| 10,810,322 B2 | 10/2020 | Dotan-Cohen et al. |
| 10,832,002 B2 | 11/2020 | Kozhaya et al. |
| 10,832,008 B2 | 11/2020 | Banerjee et al. |
| 10,838,967 B2 | 11/2020 | Wang et al. |
| 10,861,442 B2 | 12/2020 | Manoharan et al. |
| 10,880,237 B2 | 12/2020 | Anger et al. |
| 10,904,169 B2 | 1/2021 | Barve et al. |
| 10,949,748 B2 | 3/2021 | Williams et al. |
| 10,951,552 B2 | 3/2021 | Jafar Ali et al. |
| 11,050,683 B2 | 6/2021 | Ban et al. |
| 11,128,579 B2 | 9/2021 | Magliozzi et al. |
| 11,200,506 B2 | 12/2021 | Wu et al. |
| 11,283,736 B2 | 3/2022 | Anderson et al. |
| 11,295,228 B2 | 4/2022 | Hosabettu et al. |
| 2018/0025726 A1 | 1/2018 | Gatti De Bayser et al. |
| 2018/0082184 A1 | 3/2018 | Guo et al. |
| 2018/0315499 A1 | 11/2018 | Appelbaum et al. |
| 2019/0013017 A1 | 1/2019 | Kang et al. |
| 2019/0124020 A1 | 4/2019 | Bobbarjung et al. |
| 2019/0155813 A1 | 5/2019 | Harden et al. |
| 2019/0311036 A1 | 10/2019 | Kumar et al. |
| 2021/0073051 A1 | 3/2021 | Shetty et al. |
| 2021/0133234 A1 | 5/2021 | Sanur et al. |
| 2021/0357378 A1* | 11/2021 | Urdiales ................. G06F 40/30 |
| 2022/0045974 A1 | 2/2022 | Hodge |
| 2022/0092028 A1* | 3/2022 | Layton .................. G06F 16/164 |
| 2022/0116341 A1 | 4/2022 | Smullen et al. |
| 2022/0293107 A1* | 9/2022 | Leaman ................. G06F 16/951 |
| 2022/0343250 A1* | 10/2022 | Tremblay ......... G06Q 10/06316 |

OTHER PUBLICATIONS

Welch, et al; Smart Queue for Distributing User Requests To Automated Response Generating Systems; U.S. Appl. No. 17/742,019, filed May 11, 2022.

* cited by examiner

SYSTEM AND METHOD FOR INTEGRATION OF AUTOMATIC RESPONSE GENERATING SYSTEMS WITH NON-API APPLICATIONS

TECHNICAL FIELD

The present disclosure relates generally to information storage and retrieval, and more particularly, to a system and method for integration of automatic response generating systems with non-API applications.

BACKGROUND

Automated response generating systems provide a way for organizations to respond to user requests/queries automatically, without relying on direct communication between the user and a human agent. For example, an organization may employ a set of chat bots through which users may enter natural language text requests/queries, and by which automatic text responses may be generated and provided back to the users.

SUMMARY

In order to provide automatic responses to user requests/queries, chat bots typically interface with applications capable of providing information responsive to those requests/queries. This is typically done with the aid of application programming interfaces (APIs) designed for use with the applications, which the chat bots may leverage to communicate directly with the applications. However, APIs may not be available for all applications used within a system. When a chat bot receives a request associated with such a non-API application, it may be very time consuming for the chat bot to generate a response to the request, if even possible. For example, it may be necessary to send the request to a human agent who may then interact with the application to generate a response to the request. Because the number of human agents is limited, and such human agents may take longer to perform the workflows through which the response is generated (e.g., because they may be required to manually navigate through multiple browser pages associated with a web application), it may take significantly longer for a human agent to generate a response than for a chat bot to generate an automated response. If a user who submits a request to a chat bot does not receive a prompt response, the user may seek a response through a different channel, thereby wasting the computational resources associated with the chat bot request.

This disclosure contemplates an automated response generating tool capable of efficiently interfacing with non-API applications to generate responses to user requests/queries. In response to receiving a user request, the tool places the request in a queue and provides the user with an estimate of the time it will take the tool to generate a response to the request. The estimate is generated based on the current system capacity (e.g., the available processing capacity, the network load, etc.), and historical information of the actual times taken to response to historical requests submitted to the tool. An embodiment of the tool is described below.

According to an embodiment, a system includes a memory and a hardware processor communicatively coupled to the memory. The memory stores a set of videos. Each video of the set of videos is associated with an application of a set of applications and depicts a process performed using the application. For each video of the set of videos, the processor generates metadata associated with the process depicted in the video, and stores the metadata within a collection of metadata stored in the memory. The processor also receives a request for information from a user. In response to receiving the request for the information, the processor identifies a first application of the set of applications for use in generating a response to the request. The processor additionally generates, based on the collection of metadata stored in the memory, instructions for interfacing with the first application to generate the response to the request. The processor also executes the instructions to interface with the first application to generate the response to the request. The processor further transmits the response to the user.

According to another embodiment, a system includes a memory, a display, and a hardware processor communicatively coupled to the memory and the display. The hardware processor determines that the display is displaying an element associated with an application. The element includes at least one of a graphical user interface and a web browser. In response to determining that the display is displaying the element, the hardware processor records a video of the display. The video depicts a process performed using the element, to obtain a first set of information from the application. The processor also extracts, from the video of the element, metadata associated with the process depicted in the video. The processor additionally generates, based at least in part on the extracted metadata, a set of instructions for interfacing with the application. When executed by the hardware processor, the set of instructions are configured to cause the processor to interface with the application to obtain the first set of information from the application. The hardware processor further stores the set of instructions in the memory.

According to a further embodiment, a system includes a memory and a hardware processor communicatively coupled to the memory. The memory includes a queue. The queue includes a sequence of slots including a beginning slot and an end slot. Each slot of the sequence of slots is configured to store a request. The hardware processor receives, from a device of a user, a first request for information. In response to receiving the first request, the hardware processor stores the first request in the end slot of the queue. The processor also collects values for a set of parameters associated with the system. The processor additionally determines, based on the first request and the collected values for the set of parameters, an estimate of a time to generate a response to the first request. Generating the response to the first request includes identifying an application for use in generating the response, generating, based on a set of videos of processes previously performed using the application, instructions for interfacing with the application to generate the response, and executing the instructions to interface with the application to generate the response. The hardware processor further transmits, to the device of the user, the estimate of the time to generate the response to the first request.

The tool described in the present disclosure may be integrated into a practical application of an improved chat bot that is capable of interfacing with both API applications and non-API applications to generate responses to user requests. This corresponds to a technical improvement over traditional chat bots, which are typically not designed to interface with non-API applications. In particular, certain embodiments of the tool are able to automatically generate custom application programming interfaces for use in integrating with non-API applications in order to automatically generate responses to user requests, where it may not have previously been possible to generate such automatic responses. Similarly, certain embodiments of the tool are able to automatically generate custom headless browser steps that may be automatically executed by the tool, in the background, to automatically generate responses to user requests, where it may not have previously been possible to generate such automatic responses. By automatically interfacing with non-API applications to generate responses to user requests, certain embodiments of the tool are able to respond more efficiently to user requests submitted via a chat bot, than existing chat bots which may need to transfer such requests to a human agent. Accordingly, certain embodiments of the tool reduce the processing and networking resources that otherwise may be wasted when a user who has submitted a request to a chat bot does not receive a response in a timely manner and seeks other avenues for obtaining an answer to the request. Similarly, because certain embodiments of the tool are able to automatically interface with non-API applications in the background, such embodiments do not need to generate and display user interfaces and/or webpages associated with the applications. Thus, the processing and memory resources otherwise expended in generating and displaying such user interfaces and webpages may be conserved. As a further example of a technical improvement provided by the tool, certain embodiments of the tool are able to leverage previously generate custom APIs and/or sets of headless browser steps to efficiently generate new custom APIs/headless browser steps, thereby conserving the processing resources that would otherwise be expended in generating such custom APIs/headless browser steps from scratch.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 5 of the drawings, like numerals being used for like and corresponding parts of the various drawings.

I. System Overview

Figure 1:
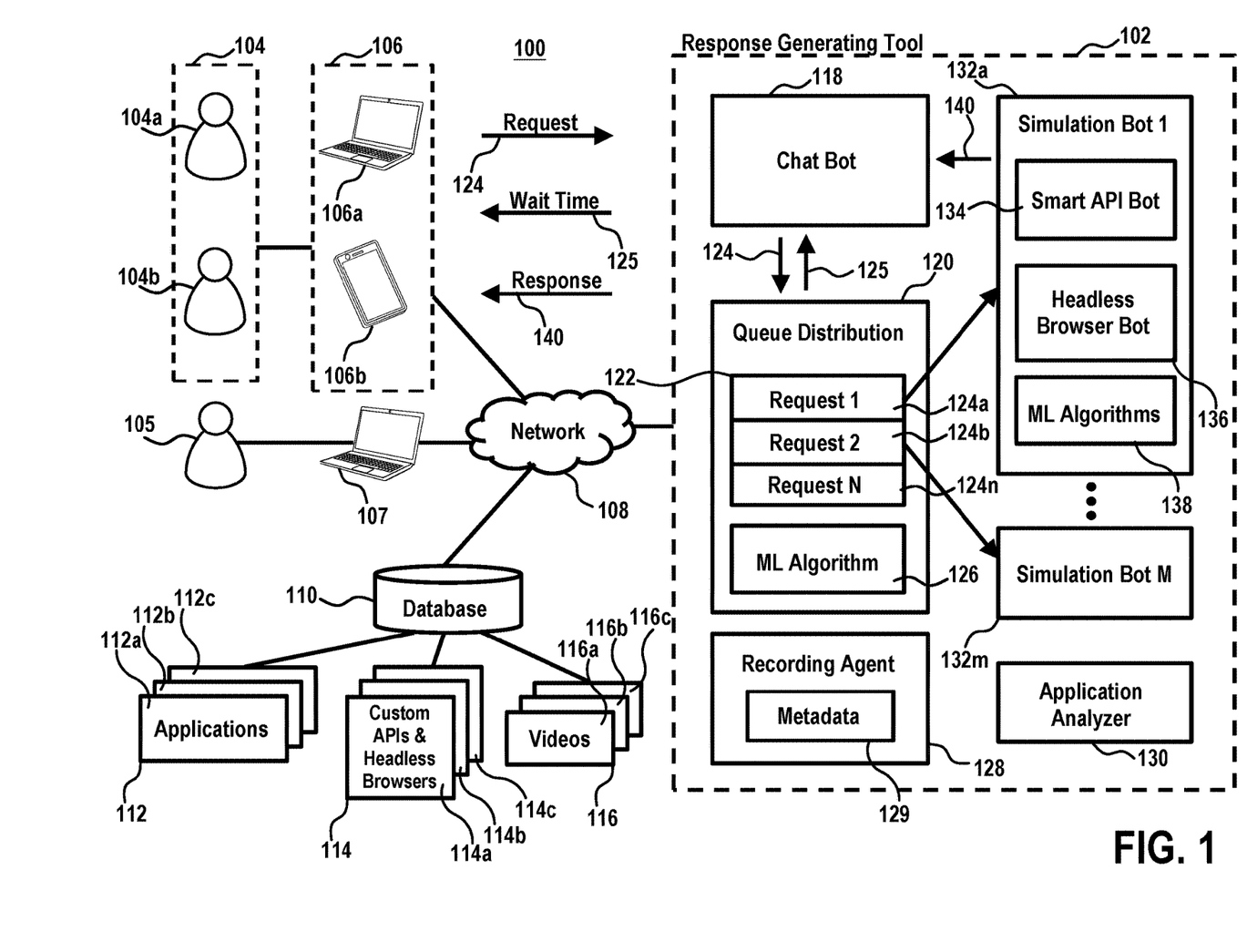
FIG. 1 illustrates an example automated response generating system.

FIG. 1 illustrates an example automated response generating system 100 that includes users 104, agents 105, user devices 106, agent devices 107, network 108, database 110, and automated response generating tool 102. Automated response generating system 100 is generally configured to receive requests 124 from users 104 and to automatically generate responses 140 to those requests. A user may be anyone with a question, request, and/or query for which response generating tool 102 may be able to provide a response. For example, a user 104 may be seeking information about an account stored with an organization to which automated response generating tool 102 belongs, information about a service provided by the organization to which automated response generating tool 102 belongs, and/or any other suitable information.

User devices 106 are used by users 104 located on network 108 to communicate with automated response generating tool 102 (or components thereof). As an example, in certain embodiments, user 104 may use device 106 to connect to automated response generating tool 102 over network 108, in order to submit requests 124 to tool 102. While described throughout this disclosure as implementing a chat bot, response generating tool 102 may be configured to receive requests 124 in any suitable form. For example, automated response generating tool 102 may be configured to receive natural language text requests, voice requests, video requests, and/or any other suitable for of requests 124. User 104 may use device 106 to connect to automated response tool 102 by: (1) entering a telephone number associated with tool 102, (2) accessing a chat feature of a webpage associated with tool 102, and/or (3) performing any other suitable action to connect device 106 to tool 102. Once connected to device 102 over network 108, user 104 may use device 106 to send requests 124 to tool 102, and to receive responses 140 from tool 102.

In certain embodiments, devices 106 are also used by users 104 to receive wait times 125 from automated response generating tool 102. Each wait time 125 corresponds to an estimate determined by automated response generating tool 102 of the time it will take for the tool to provide a response 140 back to user 104, after receiving a request 124 from the user. The manner by which response generating tool 102 determines wait times 125 is described below, and in the discussion of FIG. 2.

User devices 106 include any appropriate device for communicating with components of system 100 over network 108. For example, user devices 106 may be a telephone, a mobile phone, a computer, a laptop, a wireless or cellular telephone, a tablet, a server, an IoT device, and/or an automated assistant, among others. This disclosure contemplates user devices 106 being any appropriate device for sending and receiving communications over network 108. In certain embodiments, user device 106 may include an integrated keyboard, display, speaker, and/or microphone. In some embodiments, an external keyboard, display, speaker, and/or microphone may be connected to user device 106. User device 106 may also include any other suitable user interfaces, or other appropriate terminal equipment usable by user 104. In some embodiments, an application executed by a processor of user device 106 may perform the functions described herein.

Agent devices 107 are used by agents 105 to respond manually to requests 124. For example, where automated response generating tool 102 is unable to automatically generate a response to a request 124, automated response generating tool 102 may transmit request 124 to agent device 107, and agent 105 may use agent device 107 to access one or more applications 112 and to use the application(s) to generate response 140 to request 124. As an example, an agent 105 may use agent device 107 to navigate through one or more pages of a web application, and/or interact with one or more elements displayed by a page of a web application 112 in order to generate a response 140 to request 124.

Agent devices 107 include any appropriate device for communicating with components of system 100 over network 108. For example, agent devices 107 may be a telephone, a mobile phone, a computer, a laptop, a wireless or cellular telephone, a tablet, a server, an IoT device, and/or an automated assistant, among others. This disclosure contemplates agent devices 107 being any appropriate device for sending and receiving communications over network 108. In certain embodiments, agent device 107 may include an integrated keyboard, display, speaker, and/or microphone. In some embodiments, an external keyboard, display, speaker, and/or microphone may be connected to agent device 107. Agent device 107 may also include any other suitable user interfaces, or other appropriate terminal equipment usable by agent 105. In some embodiments, an application executed by a processor of agent device 105 may perform the functions described herein.

Network 108 facilitates communications between components of system 100 including, for example, user devices 106, agent devices 107, database 110, automated response generating tool 102, and/or components therefore. Network 108 may include any interconnecting systems capable of transmitting audio, video, signals, data, messages, or any combination of the preceding. Network 108 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable communication link, including combinations thereof, operable to facilitate communication between components of system 100. While illustrated in FIG. 1 as a single network 108, in certain embodiments, network 108 may include multiple networks. As an example, in certain embodiments, network 108 may represent both an external network connecting user devices 106 to response generating tool 102 and/or agent devices 107, and an internal network connecting the various components of response generating tool 102. For example, one or more of chat bot 118, queue distribution system 120, recording agent 128, simulation bots 132a through 132m, and application analyzer 130 may be implemented as a separate device (as described below, in the discussion of FIG. 5), and configured to communicate with the other components of automated response generating tool 102 over the internal network. Agent device 107 may also be configured to communicate over the internal network with automated response generating tool 102 and/or one or more of the components thereof.

Database 110 corresponds to any suitable storage system capable of storing applications 112, instructions associated with custom APIs and/or headless browser steps 114, and/or videos 116 of previous workflows executed using applications 112. For example, database 110 may correspond to one or more databases, file servers, cloud storage servers, hard drives, and/or any other suitable storage systems. In certain embodiments, database 110 may correspond to storage that is integrated with automated response generating tool 102. For example, database 110 may correspond to a memory associated with automated response generating tool 102. In some embodiments, database 110 may correspond to storage that is physically separate from automated response generating tool 102 and accessible to automated response generating tool 102 over a network 108, as illustrated in FIG. 1. Database 110 may also correspond to a combination of storage that is integrated with automated response generating tool 102 and storage that is separate from automated response generating tool 102 and accessible to the tool over network 108.

Applications 112 correspond to any suitable applications that may be used by automated response generating tool 102 to generate responses 140 to user requests 124. For example, applications 112 may include one or more web applications, enterprise software applications, content access software applications, spreadsheet applications, database software applications, and/or any other suitable form of application that may be used by automated response generating tool 102 to generate response 140 to user requests 124.

Applications 112 may include applications for which existing APIs are available, as well as applications for which existing APIs are not available (non-API applications). For applications for which existing APIs are available, automated response generating tool 102 may use the existing API to communicate with the application. For applications for which existing APIs are not available, automated response generating tool 102 may leverage recordings 116 of previous workflows executed using the applications, to generate custom APIs and/or headless browser steps 114 for use in integrating with the applications. The manner by which automated response generating tool 102 performs these functions is described in further detail below, and in the discussion of FIGS. 3 and 4. In certain embodiments, if automated response generating tool 102 is unable to integrate with a given application 112c in order to execute a particular workflow as part of the process of obtaining a response to a user request 124, the tool may send the request to an agent 105 who may use agent device 107 to manually use the application to execute the workflow.

The instructions associated with custom APIs and/or headless browser steps 114 includes instructions generated by automated response generating tool 102 that may be used by the tool to integrate with non-API applications to perform specific processes. For example, set 114 may include a custom API 114a previously generated by automated response generating tool 102 for use in integrating with a given application 112a, in order to perform a specific process. Similarly, set 114 may include one or more headless browser steps 114b previously generated by automated response generating tool 102 for use in integrating with a given application 112b, in order to perform a specific step of a workflow associated with that application.

The custom API processes and headless browser steps included in set 114 may be generated in any suitable manner. As an example, in certain embodiments, set 114 includes instructions manually generated by an agent 105. For example, agent 105 may use agent device 107 to generate custom code for use by automated response generating tool 102 in automatically integrating with one or more applications 112, and store the custom code within set 114. As another example, in some embodiments, automated response generating tool 102 is configured to generate the instructions associated with a custom API process and/or headless browser step 114, based on a video recording of that process/step, stored as a video 116. The manner by which automated response generating tool 102 is configured to generate the set of instructions 114 from videos 116 is described in further detail below, and in the discussion of FIG. 3.

Set of videos 116 includes videos of workflows performed using applications 112. Each video 116 corresponds to a recording of a workflow previously performed using an application 112. For example, video 116a may correspond to a video recording of the screen of agent device 107 while agent 105 executes a workflow using a given application 112a. The workflow recorded by video 116a may include multiple processes, and each process may be associated with a start and an end time within the video.

As illustrated in FIG. 1, response generating tool 102 includes chat bot 118, queue distribution system 120, recording agent 128, application analyzer 130, and simulation bots 132a through 132m. In certain embodiments, response generating tool 102 may be implemented using a single hardware device. In such embodiments, each of chat bot 118, queue distribution system 120, recording agent 128, application analyzer 130, and simulation bots 132a through 132m may correspond to software components of the device, which are stored in a memory of the device and executed by a processor of the device. In some embodiments, one or more of the components of response generating tool 102 may correspond to a separate hardware device. For example, one or more of chat bot 118, queue distribution system 120, recording agent 128, application analyzer 130, and simulation bots 132a through 132m may be implemented on a separate hardware device that include a memory storing instructions for performing the functions of the corresponding component of response generating tool 102, and a processor for executing those instructions. Further details of the hardware configuration of automated response generating tool 102 are presented below, in the discussion of FIG. 5.

In general, automated response generating tool 102 is configured to: (1) receive a request 124 from a user 104; (2) provide an estimate of the wait time 125 for generating a response to the request to the user; (3) interface with one or more applications 112 to generate a response 140 to the request 124; and (4) provide the response 140 to user 104. In certain embodiments, automated response generating tool 102 is configured to: (1) record videos 116 of workflows executed using applications 112; (2) extract metadata associated with the processes performed as part of those workflows, from the videos; (3) use the extracted metadata to generate custom API processes and/or headless browser steps 114; and (4) store the custom API processes and/or headless browser steps 114 for future use.

More specifically, chat bot 118 of automated response generating tool 102 is configured to communicate with user 104. In particular, chat bot 118 is configured to receive a request 124 from a user 104, transmit a wait time 125 to user 104, and transmit a response 140 to user 104. Chat bot 118 may receive request 124 in any suitable manner. For example, in certain embodiments, user 104a may use device 106a to connect with chat bot 118 by accessing a webpage, and entering request 124 into a chat interface displayed on the webpage. User 104 may also submit request 124 to chat bot 118 through text message, email, over the phone, and/or in any other suitable manner. In certain embodiments in which chat bot 118 is configured to receive voice requests 124 from users 104, chat bot 118 may be configured to convert the voice requests into natural language text requests.

In some embodiments, in response to receiving request 124, chat bot 118 is configured to encrypt the information associated with the request. For example, in certain embodiments, request 124 may include personally identifiable information. Chat bot 118 may be configured to encrypt this information prior to transferring it to other components of automated response generating tool 102, to help protect the privacy of the information.

In response to receiving request 124, chat bot 118 is configured to transfer the request to queue distribution system 120. Queue distribution system 120 is configured to determine a wait time 125 associated with the request (as described in detail below), and to transmit the wait time 125 to chat bot 118. Chat bot 118 then provides the wait time 125 to user 104. For example, in certain embodiments in which user 104 submitted request 124 to chat bot 118 using a chat interface on a webpage, chat bot 118 may be configured to communicate wait time 125 to the user 104 using the chat interface. For instance, chat bot 118 may cause the interface to display a message to the user, such as "Please wait x seconds for a response," "A response will be provided in x seconds," or any other suitable message that conveys the wait time 125 to user 104.

Chat bot 118 is also configured to receive a response 140 to the request 124 from one of simulation bots 132a through 132m, and to provide the response to the user 104. The manner by which simulation bots 132a through 132m generate responses 140 to requests 124 is described in detail below.

Chat bot 118 may be configured to communication with any number of users 104a/b. For example, chat bot 118 may be configured to receive a request 124a from a first user 104a and a request 124b from a second user 104b. In certain embodiments, chat bot 118 is configured to receive multiple requests 124 in parallel. For example, chat bot 118 may be configured to receive request 124a at the same time as request 124b. In some embodiments, multiple instances of chat bot 118 may exist.

As mentioned above, in response to receiving request 124 from user 104, chat bot 118 is configured to transfer the request to queue distribution system 120. As illustrated in FIG. 1, queue distribution system 120 includes a queue 122 of pending requests 124. Requests 124 may be added to queue 122 in any suitable manner. For example, in certain embodiments, requests 124 may be added to queue 122 according to the order in which they are received, such that when a new request 124n is received, it is added to the bottom of the queue 122. As another example, in some embodiments, certain requests 124 may be of a higher priority than others, and may be added to queue 122 at a position dependent on their priority. For instance, requests 124 of a highest priority may be added to the top of the queue 122 (or at a position near the top of the queue, behind earlier received requests 124 of the highest priority). In some embodiments, a request 124 may be added to queue 122 at a position that depends on both the priority of the request and the time at which the request is received, in a manner so as to ensure that lower priority requests are still addressed in a timely manner. The priority of a request 124 may be assigned in any suitable manner. For example, the priority of a given request 124 may depend on the type of the request, the user 104 who submitted the request, and/or any other suitable factor.

In response to receiving a request 124 from chat bot 118, queue distribution system 120 is configured to generate a wait time 125 for the request, and to provide the wait time back to chat bot 118, for delivery to user 104. Wait time 125 corresponds to an estimate of the time it will take for response generating tool 102 to generate a response 140 to the request 140. Queue distribution system 120 may be configured to generate wait time 125 in any suitable manner. For example, in certain embodiments, queue distribution system 120 may be configured to implement a machine learning algorithm 126 to generate wait time 125. Machine learning algorithm 126 may be configured to generate wait time 125 in any suitable manner. For example, in certain embodiments, machine learning algorithm 126 may be trained to generate wait time 125 based on the content of the request 124 and parameters collected from components of system 100. Such parameters may include the available network bandwidth, a number of background processes currently running in system 100, types of any background processes currently running in system 100, CPU utilization within system 100 (e.g., CPU utilization of automated response generating tool 102 and/or any of the components of automated response generating tool 102), the capacity of automated response generating tool 102 and/or the components thereof, the number of requests 124 currently waiting in queue 122, and/or any other suitable parameters. As a specific example of the manner by which machine learning algorithm 126 may be trained, in certain embodiments, queue distribution system 120 may store, or have access to, training data (as illustrated as training data 518 in FIG. 5). The training data may include a set of previously submitted requests, along with, for each of the previously submitted requests, a set of parameters collected from system 100 at a time approximately corresponding to the time when the previously submitted request was submitted, as well as the time it took for automated response generating tool 102 to generate a response to the previously submitted request. Machine learning algorithm 126 may be trained to identify patterns within the training data, which it may leverage to generate accurate estimates of the wait times 125 for newly submitted requests 124.

In certain embodiments, queue distribution system 120 may be configured to update machine learning algorithm 126 based on the actual time it takes automated response generating tool 102 to generate a response to a given request 124. For example, queue distribution system 120 may be configured to store each wait time estimate 125 and compare each wait time estimate 125 to the actual time it takes automated response generating tool 102 to generate the corresponding response 140. Queue distribution system 120 may then be configured to retrain machine learning algorithm 126 based on the difference between the wait time estimate 125 and the actual time.

Machine learning algorithm 126 may be any suitable machine learning algorithm capable of generating wait time estimates 125 for requests 124 submitted to automated response generating tool 102. For example, in certain embodiments, machine learning algorithm 126 may correspond to a neural network machine learning algorithm. In some embodiments, machine learning algorithm 126 may be a naïve bayes algorithm, a nearest neighbor algorithm, a support vector machine, and/or any other suitable machine learning algorithm trained to generate wait time estimates 125. Furthermore, while machine learning algorithm 126 may be a supervised machine learning algorithm trained using labeled data, as described above, this disclosure also contemplates that machine learning algorithm 126 may be an unsupervised machine learning algorithm, a semi-supervised learning algorithm, or a reinforcement learning algorithm.

In certain embodiments in which queue distribution system 120 receives the information associated with request 124 in an encrypted form for chat bot 118, queue distribution system 120 may be configured to decrypt the information. For example, in certain embodiments, queue distribution system 120 may be configured to decrypt the information prior to applying machine learning algorithm 126 to generate wait time 125.

Queue distribution system 120 is configured to monitor queue 122 and the capacity of system 100 to process new requests 124. For example, queue distribution system 120 may be configured to monitor the capacity of simulation bots 132a through 132m to process a new request 124. For instance, queue distribution system 120 may be configured to determine when the computational resources available to a given simulation bot 132a (e.g., CPU availability, memory availability, etc.), are sufficient for the simulation bot 132a to process a request 124. In some embodiments, a maximum number of simulation bots 132a through 132m may be available in system 100, and queue distribution system 120 may be configured to determine when a given simulation bot 132a finishes processing a request and is available to process a next request 124. In response to determining that a simulation bot 132a is available to process a next request 124, queue distribution system 120 is configured to transfer the request 124a at the top of queue 122 to the available simulation bot 132a. Queue distribution system 120 then adjusts queue 122, by moving the waiting requests 124b through 124n up one position within the queue.

In certain embodiments, simulation bots 132a through 132m are able to process requests 124 received from users 104 through the backend, without opening a user interface of an application 112 and/or navigating through pages of the application. For example, simulation bots 132a through 132m may be configured to execute command line commands to process the requests, as described in further detail below. In some embodiments, simulation bots 132a through 132m may not be able to process certain requests 124 in such manner. For example, an existing API may not be available for the simulation bot to interface with a given application, and/or it may not be possible for the simulation bot to automatically generate a custom API and/or a set of headless browser steps for integrating with the application. In such embodiments, it may be necessary to generate response 140 by opening a user interface associated with an application 112 and/or navigating through pages of a web application 112. For instance, automated response generating tool 102 may transmit request 124 to a human agent 105 who may then use agent device 107 to generate response 140 may interacting with the user interface of a given application 112 and/or navigate through multiple pages of a web application and/or interact with one or more elements displayed on a page of a web application. Where a user interface associated with an application 112 is opened and used to generate response 140 and/or where one or more pages of a web application 112 are opened and used to generate response 140, automated response generating tool 102 is configured to use recording agent 128 to record video 116 of the user interface/webpages. For, example, recording agent 128 may record a video 116 of the screen of agent 105's device 107, as the agent interacts with the user interface and/or web application pages to execute a workflow. In certain embodiments, recording agent 128 may be configured to record the workflows executed by agents 105 using applications 112, regardless of whether the agents are executing the workflows in order to respond to user requests 124.

For each video 116 recorded by recording agent 128, the recording agent may be configured to determine start points within the video, each corresponding to the point at which a given process executed as part of the workflow recorded by the video is started, and endpoints within the video, each corresponding to the point at which a given process executed as part of the workflow is ended. Recording agent 128 may be configured to determine start points and end points in any suitable manner. For example, in certain embodiments, recording agent 128 may be configured to determine the start and end points within a given video 116*a*, using one or more algorithms (e.g., a machine learning algorithm). As another example, in certain embodiments, recording agent 128 may be configured to receive identifications of the start and end points for the processes captured by a given video 116*a*, from agent 105.

For each process recorded by a given video 116*a*, and identified by given start and end points within the video, recording agent 128 is configured to capture metadata 129 associated with the process. This metadata provides information of the interactions performed using the user interface and/or the web application pages. For example, where the process depicted by video 116*a* includes agent 105 logging into an application 112, navigating to a first page displayed by the application, interacting with an element displayed on the first page, navigating to a second page displayed by the application, and entering text into a field displayed by the page, recording agent 128 may capture metadata 129 associated with those interactions. For example, recording agent 128 may capture metadata 129 identifying with which elements/fields the agent 105 interacted, which components of application 112 was employed, the order in which various components of application 112 were employed, the type of information entered into a given field displayed by the application, and/or any other suitable information. In certain embodiments, recording agent 128 may then leverage the extracted metadata 129 to generate a custom API for use in automatically executing the recorded process in the background, and/or a set of headless browser steps for use in automatically executing the recorded process in the background. Recording agent 128 more store these custom API process and/or headless browser steps 114 in database 110. In some embodiments, recording agent 128 may store the extracted metadata 129 for use in training a machine learning algorithm 138 to automatically generate custom APIs and/or headless browser steps for use in performing specific workflows using applications 112, as described in further detail below.

Application analyzer 130 is used by automated response generating tool 102 to identify one or more applications 112 to employ in generating a response 140 to a user request 124. For example, application analyzer 130 may be configured to employ a set of rules (stored as part of application analyzer instructions 514, illustrated in FIG. 5), to identify one or more applications 112 to employ. Such rules may specify, for a given type of request, an application 112 to use to address the request. In some embodiments, application analyzer 130 may use a machine learning algorithm to identify the one or more applications 112 to use in generating responses 140 to requests 124. For example, the machine learning algorithm may be trained based on labeled data that specifies the application 112 that was used to respond to a previously submitted request 124.

In certain embodiments, application analyzer 130 may also be used to determine whether a set of headless browser steps may be executed (e.g., command line instructions) to interact with the selected application 112 or whether a custom API should be used instead (because, for example, it is not possible to perform the necessary steps using only command line instructions).

Application analyzer 130 may be implement before or after queue distribution system 120 transmits a request 124 to a simulation bot 132. For example, in certain embodiments, queue distribution system 120 may use application analyzer 130 to identify one or more applications 112 for use by the simulation bot 132 to which the request will be sent, along with a determination of whether or not it is possible to use headless browser steps to interface with the application to execute the process used to generate the response 140. Queue distribution system 120 may then transmit this information to the simulation bot 132 along with the request 124. In some embodiments, the simulation bot 132 to which the request 124 is sent may use application analyzer 130 to identify one or more applications 112 to use to respond to the request, and to determine whether it is possible to use headless browser steps to interface with the application(s). In further embodiments, queue distribution system 120 may send the request 124 to application analyzer 130 which may then identify application(s) 112 and determine whether it is possible to use headless browser steps to interface with the application(s), and then forward this information, along with the request 124, to the selected simulation bot 132.

Each of simulation bots 132*a* through 132*m* is configured to receive a user request 124 (or information associated with the request), and to generate a response 140 to the request, by interfacing with one or more applications 112. To do so, simulation bot 132 may operate as either a smart API simulation bot 134, which is configured to automatically generate a custom API for use in interfacing with the application(s) 112, and/or as a headless browser simulation bot 136, which is configured to automatically generate a set of headless browser steps for use in interfacing with the application(s) 112. Each of smart API simulation bot 134 and headless browser simulation bot 136 is configured to use one or more machine learning algorithms 138 to generate the custom API and/or set of headless browser steps for use in interfacing with a given application 112. Machine learning algorithms 138 may be any suitable machine learning algorithms capable of generating custom APIs and/or headless browser steps. In certain embodiments, machine learning algorithms 138 may be configured to leverage metadata 129 extracted by recording agent 128 to generate custom APIs and/or headless browser steps. In some embodiments, machine learning algorithms 138 may be configured to leverage previously generated custom APIs and/or headless browser steps 114, including, for example, custom APIs and/or headless browser steps 114 manually produced by agents 105. In certain embodiments, in response to generating a custom API and/or a custom set of headless browser steps, simulation bot 132 may be configured to store the generated API/headless browser steps in database 110 for future use.

In certain embodiments, machine learning algorithms 138 may be configured to first determine whether any historical custom APIs and/or sets of headless browser steps 114 exist for the specific process simulation bot 132 is seeking to perform, prior to generating new custom APIs and/or headless browser steps 114 using metadata 129 and/or the information stored in set 114. In some embodiments, machine learning algorithms 138 may be configured to use both previously generated custom APIs and/or sets of headless browser steps 114 and metadata 129 to generate new custom APIs and/or sets of headless browser steps for use in addressing current requests 124. For example, consider a request 124 from a user 104 seeking an address stored within an account belonging to the user. A machine learning algorithm 138 may be configured to identify a custom API that was generated to respond to a historical request that is similar to request 124, but which requires implementation of a slightly different process. For instance, machine learning algorithm 138 may be configured to identify a custom API that was generated to respond to a historical request from a user 104 seeking a phone number stored within an account belonging to the user, where the phone number is stored in the same database as the address. Machine learning algorithm 138 may be configured to leverage metadata 129 associated with a video 116 in which a phone number was retrieved from the database, in order to modify the custom API that was generated to return a phone number, such that it returns an address instead.

Machine learning algorithms 138 may include any suitable algorithms configured to generate custom APIs and/or sets of headless browser steps 114 for use in integrating with applications 112 to generate responses 140 to user requests 124. For example, machine learning algorithms 138 may include supervised machine learning algorithms, semi-supervised machine learning algorithms, unsupervised machine learning algorithms, and/or reinforcement learning algorithms. In certain embodiments, machine learning algorithms 138 may correspond to a first machine learning algorithm configured to generate custom APIs, and a second machine learning algorithm configured to generate sets of headless browser steps.

In response to using machine learning algorithms 138 to generate a custom API and/or a set of headless browser steps, simulation bot 132 is configured to execute the custom API and/or set of headless browser steps in order to integrate with application 112, to generate response 140. Simulation bot 132 is then configured to transmit the response 140 to chat bot 118, which returns the response 140 to user 104.

Modifications, additions, or omissions may be made to the systems described herein without departing from the scope of the invention. For example, system 100 may include any number of users 104, agents 105, user devices 106, agent devices 107, networks 108, databases 110, applications 112, custom APIs and/or headless browser steps 114, videos 116, chat bots 118, queue distribution systems 120, queues 122, machine learning algorithms 126, recording agents 128, application analyzers 130, simulation bots 132a through 132m, and machine learning algorithms 138. The components may be integrated or separated. Moreover, the operations may be performed by more, fewer, or other components. Additionally, the operations may be performed using any suitable logic comprising software, hardware, and/or other logic.

II. Queue Management

Figure 2:
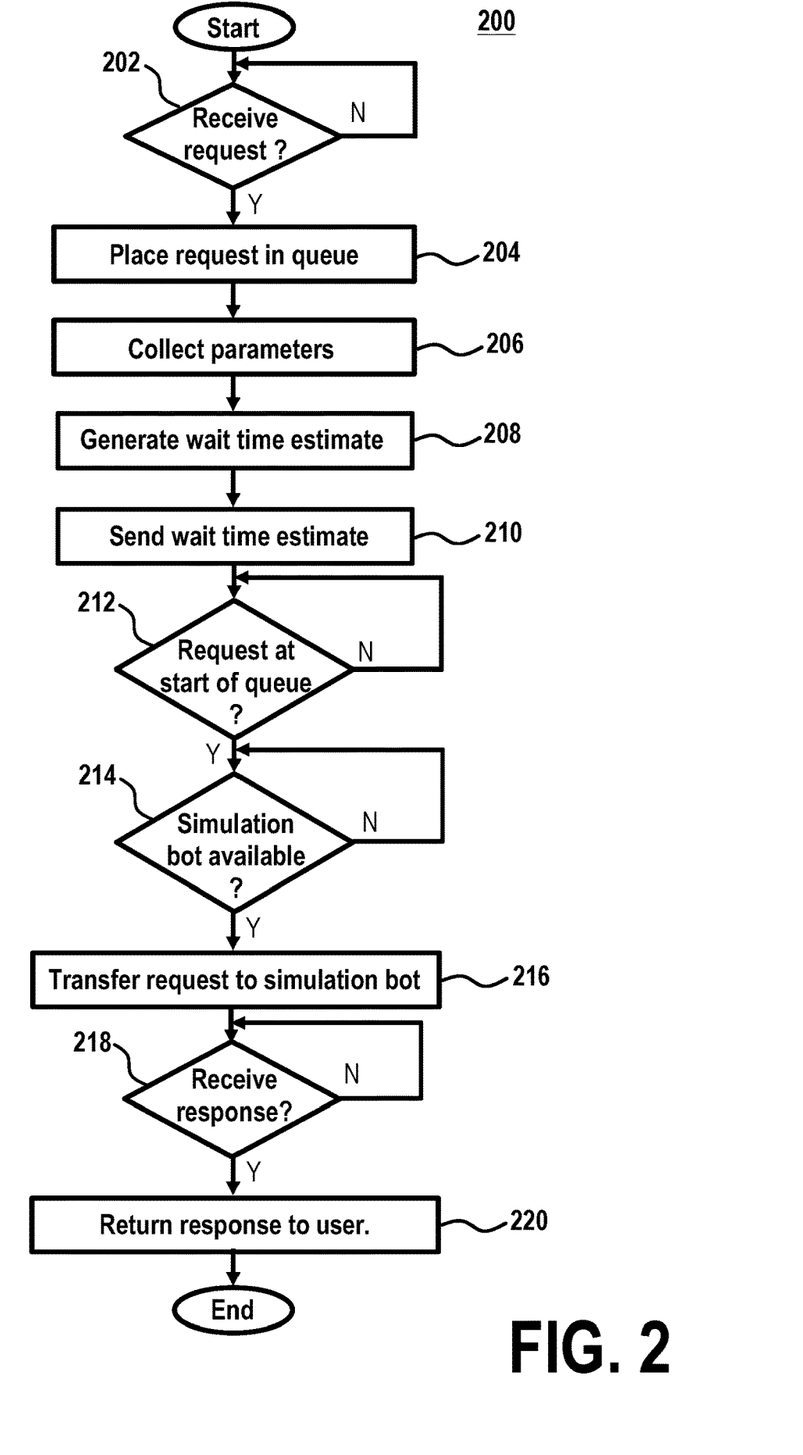
FIG. 2 presents a flowchart illustrating the manner by which the automated response generating tool of the system of FIG. 1 determines an estimate of the time it will take for the tool to respond to a user request.

FIG. 2 presents a flowchart illustrating an example method 200 (described in conjunction with elements of FIG. 1) by which response generating tool 102 processes requests 124.

During operation 202, automated response generating tool 102 determines whether it has received a request 124 from user 104. In particular, in certain embodiments, chat bot 118 determines whether it has received a request 124 from user 104. If, during operation 202 chat bot 118 determines that it has received a request 124, during operation 204 automated response generating tool 102 places request 124 in queue 122. For example, in certain embodiments, chat bot 118 transmits request 124 to queue distribution system 120, which then places request 124 in queue 122. In certain such embodiments, chat bot 118 may be configured to encrypt request 124 prior to transmitting request 124 to queue distribution system 120. Queue distribution system 120 is configured to add a newly received request (e.g., request 124n) to queue 122. For example, in certain embodiments, queue distribution system 120 is configured to add a newly received request (e.g., request 124n) to the bottom of queue 122. As another example, in some embodiments, queue distribution system 120 may be configured to place a newly received request 124 at a position within queue 122 dependent on a priority of the request. In certain embodiments in which queue distribution system 120 receives an encrypted request 124, queue distribution system 120 is further configured to decrypt the request.

During operation 206, automated response generating tool 102 collects parameters associated with request 124 and/or system 100 (e.g., CPU capacity, network bandwidth, etc.), for use in generating an estimate of the time it will take the tool to generate a response to the request. In particular, in certain embodiments, queue distribution system 120 is configured to collect such parameters. During operation 208, automated response generating tool 102 uses the collected parameters to generate wait time 125. In particular, in certain embodiments, queue distribution system 120 uses machine learning algorithm 126 to determine wait time 125, based on the particular request 124 and/or the parameters collected from the system. Machine learning algorithm 126 may be any suitable machine learning algorithm capable of generating a wait time estimate 125 for a given request 124, based on information associated with the request and the current state of the system 100, as reflected by the system parameters collected by queue distribution system 120. For instance, as explained above, in the discussion of FIG. 1, machine learning algorithm may be a supervised neural network algorithm trained based on training data that includes a set of historical requests and, for each historical request, a set of parameters collected from the system 100 at approximately the same time as the request was submitted/received, and the actual time it tool for automated response generating tool 102 to respond to the request. During operation 210 automated response generating tool 102 transmits wait time 125 to user 104. For example, in certain embodiments in which queue distribution system 120 generates wait time estimate 125, queue distribution system 120 transmits wait time 125 to chat bot 118, and chat bot 118 returns the wait time 125 to user 104.

During operation 212 automated response generating tool 102 determines whether request 124 is at the top of queue 122. In particular, in certain embodiments, queue distribution system 120 determines whether request 124 is at the top of queue 122. If, during operating 212 automated response generating tool 102 determines that request 124 is at the top of queue 122, during operating 214 automated response generating tool 102 determines whether a simulation bot 132 is available to process the request. In particular, in certain embodiments, queue distribution system 120 determines if a simulation bot 132a through 132m is available to process the request, based on, for example, the processing capacity of the simulation bot and/or whether the simulation bot is currently processing any other requests 124. If, during operation 214 automated response generating tool 102 determines that a simulation bot 132 is available to process the request, during operation 216 automated response generating tool 102 transfers the request to the available simulation bot 132. In particular, queue distribution system 120 transfers the request 124 to the available simulation bot 132. In certain embodiments, queue distribution system 120 is also configured to transmit an identification of the application(s) 112 that simulation bot 132 should use to generate the response 140 to the request, and a determination of whether or not it is possible to use headless browser steps to integrate with the identified application(s) 112. In such embodiments, queue distribution system 120 obtains such information by implementing application analyzer 130. In some embodiments, during operation 216, queue distribution system 120 transfers the request 124 to the simulation bot 132 by first transferring the request to application analyzer 138, which then forwards the request on to the simulation bot 132, along with the identification of the application(s) 112 to use in generating response 140 and the determination of whether or not headless browser steps may be used to integrate with the application(s) 112. The manner by which the simulation bot processes the request is described in further detail below, in the discussion of FIG. 4.

During operation 218 automated response generating tool 102 determines whether it has received a response 140 from the simulation bot 132. In particular, in certain embodiments, chat bot 218 determines whether it has received a response 140 from the simulation bot 132. If, during operation 218 automated response generating tool 102 determines that it has received a response 140 from the simulation bot 132, during operation 220 automated response generating tool 102 transmits the response 140 to user 104. In particular, in certain embodiments, chat bot 118 transmits the response 140 to user 104.

Modifications, additions, or omissions may be made to method 200 depicted in FIG. 2. Method 200 may include more, fewer, or other operations. For example, operations may be performed in parallel or in any suitable order. While discussed as automated response generating tool 102 (or components thereof) performing certain operations, any suitable components of system 100, including, for example, devices 106, may perform one or more operations of the method.

III. Leveraging Previously Executed Workflows

Figure 3:
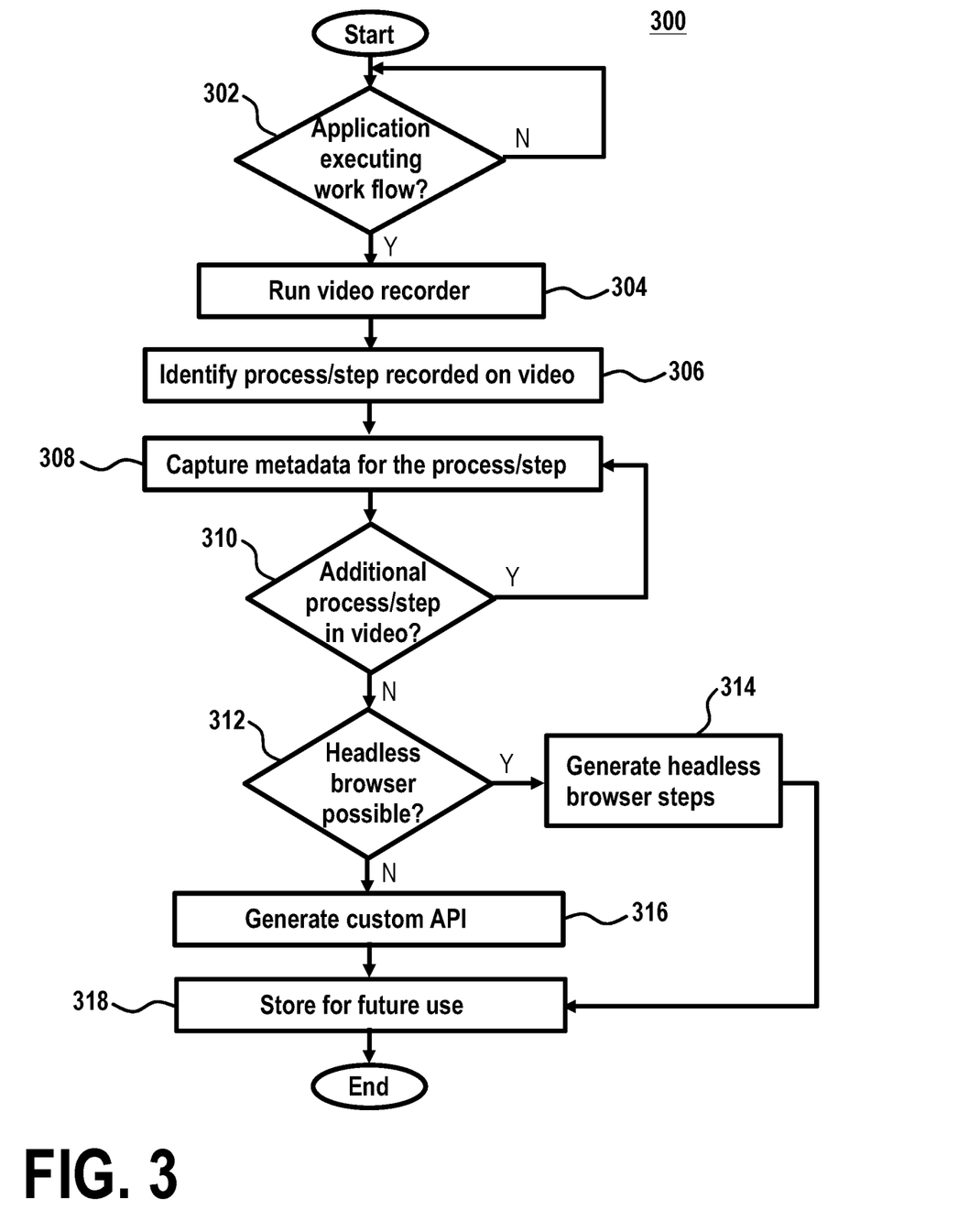
FIG. 3 presents a flowchart illustrating the manner by which the automated response generating tool of the system of FIG. 1 generates and stores instructions for future use by the tool in interfacing with non-API applications.

FIG. 3 presents a flowchart illustrating an example method 300 (described in conjunction with elements of FIG. 1) used by automated response generating tool 102 to generate and store headless browser steps and/or smart API processes for future use by automated response generating tool 102 in interfacing with non-API applications 112.

During operation 302 recording agent 128 of automated response generating tool 102 determines whether an application 112 has been engaged to execute a workflow. For example, in certain embodiments, recording agent 128 is configured to determine whether agent 105 has launched a given application 112. If, during operation 302 recording agent 128 determines that an application 112 has been engaged to execute a workflow, during operation 304 recording agent 128 records video 116 of the processes performed using the application. Recording agent 128 is configured to run in the background and record video 116 of user interfaces and/or web application pages displayed while applications 112 are used to execute workflows. For example, in certain embodiments, recording agent 128 is configured to record video 116 of the content displayed on the screen of agent device 107, which agent 105 is executing a workflow associated with an application 112 by interacting with a user interface generated by application 112 or with one or more pages generated by a web application 112.

During operation 306 recording agent 128 identifies a process/step performed using the application and recorded on the video 116. For example, recording agent 128 may identify a start point and an end point associated with the process/step within video 116. Recording agent 128 may be configured to identify the start point and the end point in any suitable manner. For example, in certain embodiments, recording agent 128 may use a machine learning algorithm to identify the start point and the end point. As another example, in some embodiments, recording agent 128 may receive identifications of the start and end points from agent 105. During operation 308 recording agent 128 uses the identified start and end points for a given process/step to capture metadata 129 associated with that process/step from the video 116. In certain embodiments, recording agent 128 stores metadata 129 for future use by automated response generating tool 102 in generating custom APIs and/or custom headless browser steps 114.

During operation 310 recording agent 128 determines whether any additional processes/steps performed using the application 112 were captured by the video 116. If, during operation 310 automated response generating tool 102 determines that one or more additional processes/steps were recorded on the video 116, method 300 returns to operation 308.

If, during operation 310 recording agent 128 determines that no additional processes/steps were recorded on the video 116, during operation 312 recording agent 128 determines whether it is possible to interface with the associated application 112 using a headless browser. If, during operation 312 recording agent 128 determines that it is possible to interface with application 112 using a headless browser, during operation 314 recording agent 128 uses the metadata 129 captured from the video 116 to generate one or more headless browser steps for execution to interface with application 112 to automatically perform the processes/steps recorded in video 116.

If, during operation 312 recording agent 128 determines that it is not possible to interface with application 112 using a headless browser, during operation 316 recording agent 128 uses the metadata 129 captured from the video 116 to generate a custom API for execution to interface with application 112, to automatically perform the processes/steps recorded in video 116. During operation 318 recording agent 128 then stores the headless browser steps or customer API for future use.

Modifications, additions, or omissions may be made to method 300 depicted in FIG. 3. Method 300 may include more, fewer, or other operations. For example, operations may be performed in parallel or in any suitable order. While discussed as automated response generating tool 102 (or components thereof) performing certain operations, any suitable components of system 100, including, for example, devices 106, may perform one or more operations of the method.

IV. Interfacing with Non-API Applications

Figure 4:
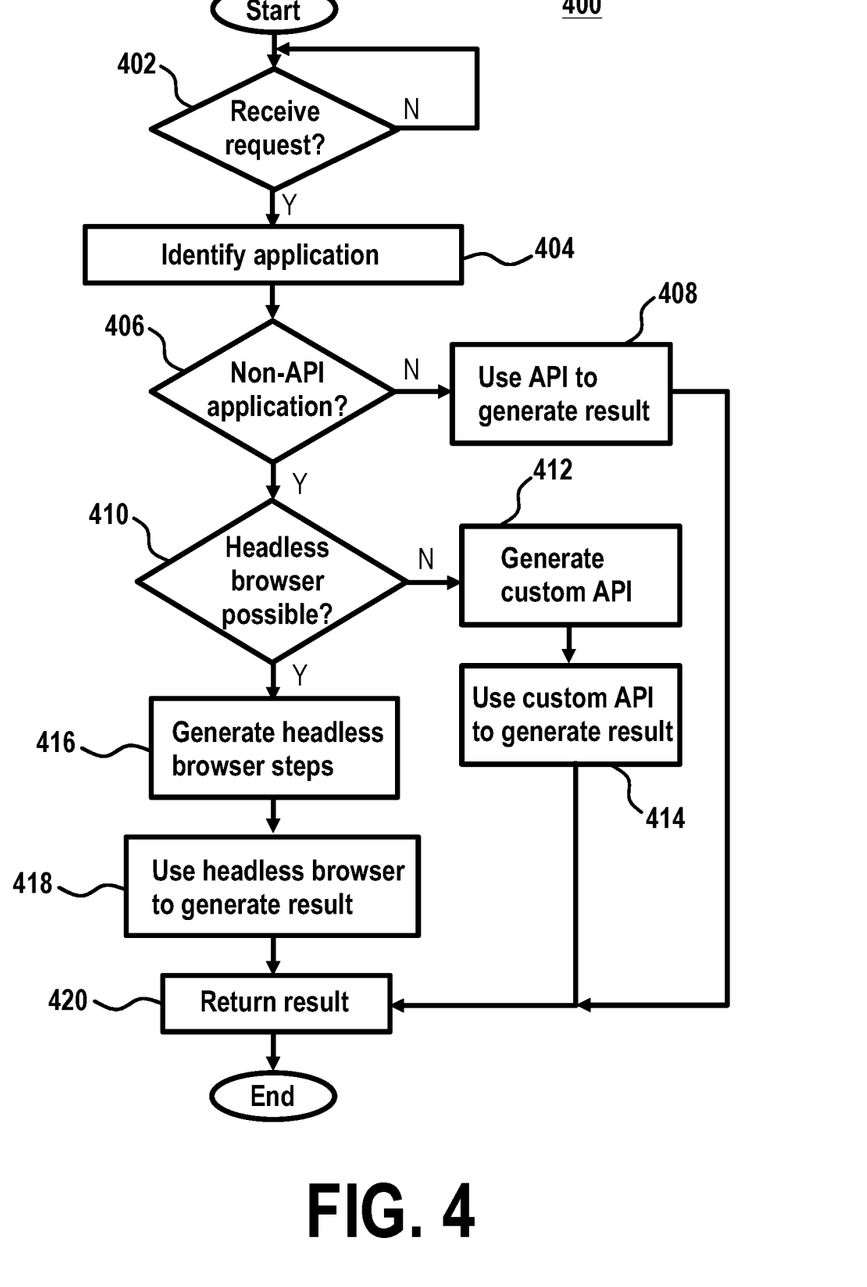
FIG. 4 presents a flowchart illustrating the manner by which the automated response generating tool of the system of FIG. 1 interfaces with non-API applications to generate automated responses to user requests.

FIG. 4 presents a flowchart illustrating an example method 400 (described in conjunction with elements of FIG. 1) used by automated response generating tool 102 to interface with both API and non-API applications to generate automated responses 140 to user requests 124.

During operation 402 automated response generating tool 102 or a component thereof determines whether it has received a request 124. For example, in certain embodiments, a simulation bot 132 of automated response generating tool 102 determines whether it has received a request 124 from queue distribution system 120.

If, during operation 402 automated response generating tool 102 determines that it has received a request 124, during operation 404 the tool identifies an application 112 that may be used to generate a response 140 to the request. For example, in certain embodiments, simulation bot 132 identifies an application 112 that may be used to generate a response 130 to the request by implementing application analyzer 130. As another example, in certain embodiments, simulation bot 132 identifies an application 112 that may be used to generate a response 130 to the request 124 based on information received from queue distribution system 120. For instance, queue distribution system 120 may have implemented application analyzer 130 to identify the application 112 prior to transferring the request 124 to simulation bot 132, and may have transmitted the identification of the application 112 to the simulation bot 132 along with the request 124. During operation 406 automated response generating tool 102 determines whether the identified application is a non-API application. In particular, in certain embodiments, simulation bot 132 determines whether the identified application 112 is a non-API application. If, during operation 406 automated response generating tool 102 determines that the identified application is not a non-API application (e.g., the application is associated with one or more existing APIs for use in interfacing with the application), during operation 408 automated response generating tool 102 uses the existing API to interface with the application to generate the response 140 to the request 124. In particular, in certain embodiments, simulation bot 132 uses the existing API to interface with the identified application 112 to generate the request 140.

If, during operation 406 automated response generating tool 102 determines that the identified application 112 is a non-API application, during operation 410 automated response generating tool 102 determines whether it is possible to interface with the application using a headless browser. In particular, in certain embodiments, simulation bot 132 determines whether it is possible to interface with the application 112 using a headless browser. Simulation bot 132 may determine whether it is possible to interface with the identified application 112 using a headless browser in any suitable manner. For example, in certain embodiments, simulation bot 132 uses application analyzer 130 to determine whether it is possible to interface with the identified application 112 using a headless browser. As another example, in some embodiments, simulation bot 132 receives a determination of whether or not it is possible to interface with the identified application 112 using a headless browser from queue distribution system 120. If, during operation 410 automated response generating tool 102 determines that it is possible to interface with the application 112 using a headless browser, during operation 416 automated response generating tool 102 generates one or more headless browser steps for interfacing with the application. In particular, in certain embodiments, simulation bot 132 generates one or more headless browser steps for interfacing with the application. Simulation bot 132 may be configured to generate the headless browser steps in any suitable manner. For example, in certain embodiments, simulation bot 132 is configured to use machine learning algorithms 138 to generate the headless browser steps, based on metadata 129 and/or previously generated sets of headless browser steps 114. Further details of the manner by which simulation bot 132 uses machine learning algorithm 138 to generate the headless browser steps for integrating with the application 112 are provided above, in the discussion of FIG. 1. During operation 418 automated response generating tool 102 executes the headless browser steps to interface with the application in order to generate the response 140. In particular, in certain embodiments, the simulation bot 132 executes the headless browser steps to interface with the application 112 in order to generate response 140.

If, during operation 410 automated response generating tool 102 determines that it is not possible to interface with the application 112 using a headless browser, during operation 412 automated response generating tool 102 generates a custom API for use in interfacing with the application 112. In particular, in certain embodiments, simulation bot 132 generates a custom API for use in interfacing with the application. Simulation bot 132 may be configured to generate the custom API in any suitable manner. For example, in certain embodiments, simulation bot 132 is configured to use machine learning algorithms 138 to generate the custom API, based on metadata 129 and/or previously generated custom APIs 114. Further details of the manner by which simulation bot 132 uses machine learning algorithm 138 to generate the custom API for use in integrating with the application 112 are provided above, in the discussion of FIG. 1. During operation 414 automated response generating tool 102 uses the custom API to interface with the application 112 in order to generate the response 140. In particular, in certain embodiments, the simulation bot 132 executes the custom API to interface with the application 112 in order to generate response 140.

During operation 420 automated response generating tool 102 transmits response 140 to user 104. For example, in certain embodiments, in response to generating response 140, simulation bot 132 is configured to transfer response 140 to chat bot 118, which then provides the response to user 104.

Modifications, additions, or omissions may be made to method 400 depicted in FIG. 4. Method 400 may include more, fewer, or other operations. For example, operations may be performed in parallel or in any suitable order. While discussed as automated response generating tool 102 (or components thereof) performing certain operations, any suitable components of system 100, including, for example, devices 106, may perform one or more operations of the method.

V. Hardware Configuration

Figure 5:
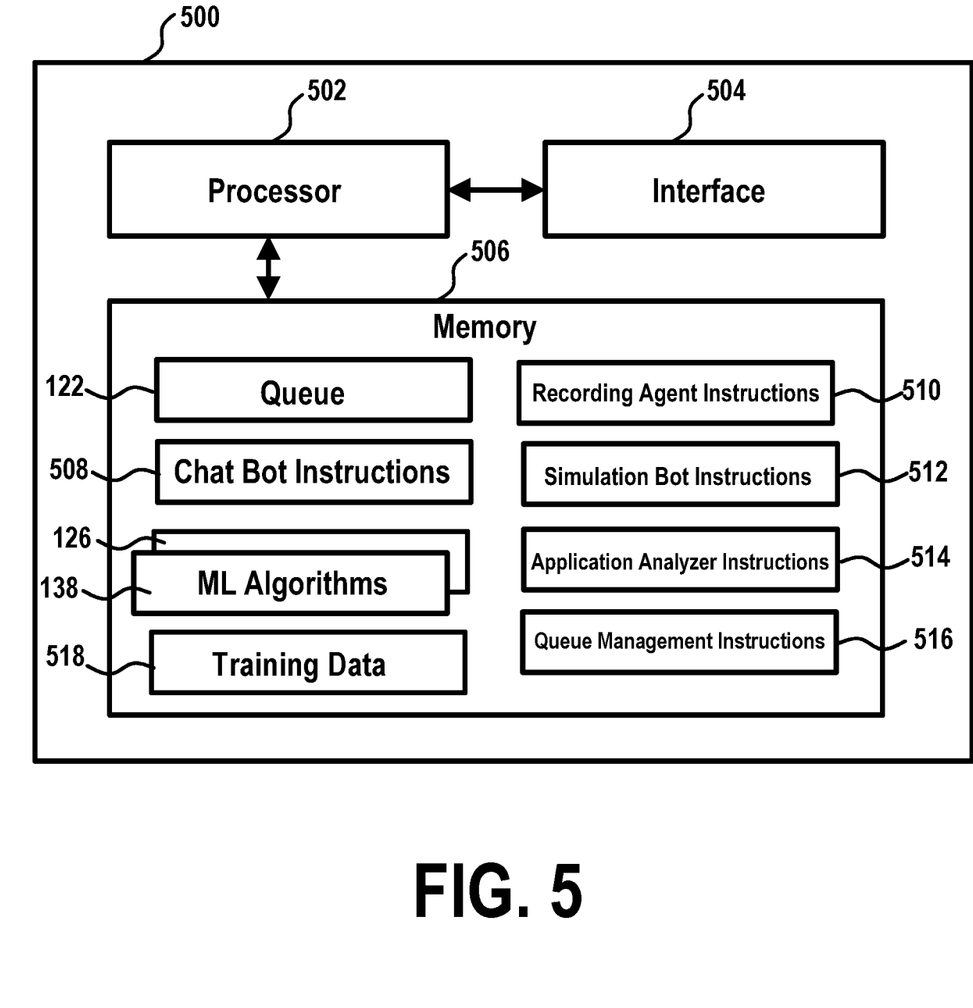
FIG. 5 is an embodiment of the automated response generating tool of the system of FIG. 1 and/or a component of the automated response generating tool.

FIG. 5 is an example embodiment of a device 500 of automated response generating system 100. As illustrated in FIG. 5, device 500 includes a processor 502, an interface 504, and a memory 506. This disclosure contemplates that device 500 may be configured as shown in FIG. 5, or in any other suitable configuration.

As illustrated in FIG. 5, device 500 corresponds to automated response generating tool 102 and stores, in memory 506, instructions for execution by processor 502 to implement the various components of automated response generating tool 102, including, for example, instructions 508 for implementing chat bot 118, instructions 516 for implementing queue distribution system 120, instructions 510 for implementing recording agent 128, instructions 514 for implementing application analyzer 130, and instructions 512 for implementing simulation bots 132. However, this disclosure contemplates that one or more of chat bot 118, queue distribution system 120, recording agent 128, application analyzer 130, and simulation bots 132a through 132m may be implemented as a separate device 500, with its own processor 502, interface 504, and memory 506. As a specific example, chat bot 118 may be implemented as a device 500, with a memory 506 storing chat bot instructions 508.

Processor 502 comprises one or more processors operably coupled to memory 506, and network interface 504. Processor 502 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). Processor 502 may be a programmable logic device, a microcontroller, a microprocessor, or any suitable combination of the preceding. Processor 502 is communicatively coupled to and in signal communication with memory 506, and network interface 504. The one or more processors represented by processor 502 are configured to process data and may be implemented in hardware or software. For example, processor 502 may be 8-bit, 16-bit, 32-bit, 64-bit, or of any other suitable architecture. Processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors represented by processor 502 are configured to implement various instructions. For example, the one or more processors represented by processor 502 are configured to execute chat bot instructions 508 to implement chat bot 118, queue management instructions 516 for implementing queue distribution system 120, recording agent instructions 510 for implementing recording agent 128, application analyzer instructions 514 for implementing application analyzer 130, and simulation bot instructions 512 for implementing simulation bots 132. In this way, processor 502 may be a special-purpose computer designed to implement the functions disclosed herein. As explained above, in certain embodiments, processor 502 may be configured to perform the functions of each of chat bot 118, queue distribution system 120, recording agent 128, application analyzer 130, and simulation bots 132, or may be configured to perform the functions of a subset of one or more of chat bot 118, queue distribution system 120, recording agent 128, application analyzer 130, and simulation bots 132a through 132m. Each of these components of automated response generating tool 102 is configured to operate as described above for FIGS. 1 through 4.

Network interface 504 is configured to enable wired and/or wireless communication. Network interface 504 is configured to communicate data between automated response generating system 102 (or components thereof), user devices 106, and other devices, systems, or domains. For example, network interface 504 may comprise a Near Field Communication (NFC) interface, a Bluetooth interface, a Zigbee interface, a Z-wave interface, an RFID interface, a WIFI interface, a LAN interface, a WAN interface, a PAN interface, a modem, a switch, or a router. Processor 502 is configured to send and receive data using the network interface 504. Network interface 504 may be configured to use any suitable type of communication protocol as would be appreciated by one of ordinary skill in the art.

Memory 506 is operable to store any of the information described above with respect to FIGS. 1 through 4 along with any other data, instructions, logic, rules, or code operable to implement the function(s) described herein when executed by the processor 502. Memory 506 comprises one or more disks, tape drives, or solid-state drives, and may be used as an over-flow data storage device, to store programs when such programs are selected for execution, and to store instructions and data that are read during program execution. Memory 506 may be volatile or non-volatile and may comprise a read-only memory (ROM), random-access memory (RAM), ternary content-addressable memory (TCAM), dynamic random-access memory (DRAM), and static random-access memory (SRAM).

Memory 506 is operable to store queue 122, machine learning algorithms 126 and 138, training data 518, chat bot instructions 508, recording agent instructions 510, simulation bot instructions 512, application analyzer instructions 514, and queue management instructions 516. Chat bot instructions 508 may include any suitable set of instructions, logic, rules, or code operable to execute chat bot 118. Recording agent instructions 510 may include any suitable set of instructions, logic, rules, or code operable to execute recording agent 128. Simulation bot instructions 512 may include any suitable set of instructions, logic, rules, or code operable to execute each of simulation bots 132a through 132m. Application analyzer instructions 514 may include any suitable set of instructions, logic, rules, or code operable to execute application analyzer 130. Queue management instructions 516 may include any suitable set of instructions, logic, rules, or code operable to execute queue distribution system 120.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:
1. A system comprising:
  a memory configured to store:
    a set of videos, each video of the set of videos associated with a corresponding application of a set of applications and depicting a process performed using the application; and
  a hardware processor communicatively coupled to the memory, the hardware processor configured to:
  for each video of the set of videos:
    generate metadata associated with the process depicted in the video; and
    store the metadata within a collection of metadata stored in the memory;
  receive a request for information from a user;

determine an estimate of a wait time to generate a response to the request to the user; and in response to receiving the request for the information:
in conjunction with transmitting the estimate of the wait time to the user, identify an application of the set of applications for use in generating the response to the request, wherein the application is not associated with an available application programming interface (API);
generate, based on the collection of metadata stored in the memory, instructions for interfacing with the application to generate the response to the request;
execute the instructions to interface with the application to generate the response to the request; and
transmit the response to the user.

2. The system of claim 1, wherein:
in response to receiving the request for information, the hardware processor is further configured to:
store the request for information at an end of a queue; and
monitor a position of the request within the queue; and
generating the response to the request is performed in response to determining that the request is at a top of the queue.

3. The system of claim 2, wherein, in response to storing the request for information at the end of the queue, the hardware processor is further configured to:
collect values for a set of parameters associated with the system;
determine, based on the request for the information and the collected values for the set of parameters, the estimate of the wait time to generate the response to the request; and
transmit, to the user, the estimate of the wait time to generate the response to the request.

4. The system of claim 3, wherein:
the memory is further configured to store:
training data comprising a plurality of historical requests, wherein for each historical request of the plurality of historical requests, the training data further comprises a set of historical parameters associated with the historical request and a historical time taken to respond to the historical request; and
a machine learning algorithm; and
the hardware processor is further configured to:
train the machine learning algorithm, based on the training data, to determine the estimate of the wait time to generate the response to the request; and
determine the estimate of the wait time to generate the response to the request comprises executing the machine learning algorithm.

5. The system of claim 1, wherein the instructions for interfacing with the application comprise at least one of:
a custom API for interfacing with the application; and
a set of headless browser steps for interfacing with the application.

6. The system of claim 1, wherein:
the memory is further configured to store a plurality of sets of instructions, wherein each set of instructions of the plurality of sets of instructions:
is associated with a particular process depicted in a particular video of the set of videos;
comprises instructions for interfacing with the application associated with the particular video; and
was generated based on the metadata associated with the particular process depicted in the particular video; and generating the instructions for interfacing with the application comprises identifying the instructions for interfacing with the application within the plurality of sets of instructions stored in the memory.

7. The system of claim 1, wherein:
the memory is further configured to store a plurality of sets of instructions, wherein each set of instructions of the plurality of sets of instructions:
is associated with a particular process depicted in a particular video of the set of videos;
comprises instructions for interfacing with the application associated with the particular video; and
was generated based on the metadata associated with the particular process depicted in the particular video; and
generating the instructions for interfacing with the application comprises executing a machine learning algorithm trained to generate the instructions for interfacing with the application, based on the plurality of sets of instructions stored in the memory.

8. A method comprising:
recording a set of videos, each video of the set of videos associated with an application of a set of applications and depicting a process performed using the application;
for each video of the set of videos:
generating metadata associated with the process depicted in the video; and
storing the metadata within a collection of metadata;
receiving a request for information from a user;
determining an estimate of a wait time to generate a response to the request to the user; and
in response to receiving the request for the information:
in conjunction with transmitting the estimate of the wait time to the user, identifying an application of the set of applications for use in generating the response to the request, wherein the application is not associated with an available application programming interface (API);
generating, based on the collection of metadata, instructions for interfacing with the application to generate the response to the request;
executing the instructions to interface with the application to generate the response to the request; and
transmitting the response to the user.

9. The method of claim 8, wherein:
in response to receiving the request for information, the method further comprises:
storing the request for information at an end of a queue; and
monitoring a position of the request within the queue; and
generating the response to the request is performed in response to determining that the request is at a top of the queue.

10. The method of claim 9, wherein, in response to storing the request for information at the end of the queue, the method further comprises:
collecting values for a set of parameters associated with a system;
determining, based on the request for the information and the collected values for the set of parameters, the estimate of the wait time to generate the response to the request; and
transmitting, to the user, the estimate of the wait time to generate the response to the request.

11. The method of claim 10, wherein:
the method further comprises training a machine learning algorithm, based on training data, to determine the estimate of the wait time to generate the response to the request, the training data comprising a plurality of historical requests, wherein for each historical request of the plurality of historical requests, the training data further comprises a set of historical parameters associated with the historical request and a historical time taken to respond to the historical request; and
determining the estimate of the wait time to generate the response to the request comprises executing the machine learning algorithm.

12. The method of claim 8, wherein the instructions for interfacing with the application comprise at least one of:
a custom API for interfacing with the application; and
a set of headless browser steps for interfacing with the application.

13. The method of claim 8, wherein generating the instructions for interfacing with the application comprises identifying the instructions for interfacing with the application within a plurality of sets of instructions stored in a memory, wherein each set of instructions of the plurality of sets of instructions:
is associated with a particular process depicted in a particular video of the set of videos;
comprises instructions for interfacing with the application associated with the particular video; and
was generated based on the metadata associated with the particular process depicted in the particular video.

14. The method of claim 8, wherein generating the instructions for interfacing with the application comprises executing a machine learning algorithm trained to generate the instructions for interfacing with the application, based on a plurality of sets of instructions stored in a memory, wherein each set of instructions of the plurality of sets of instructions:
is associated with a particular process depicted in a particular video of the set of videos;
comprises instructions for interfacing with the application associated with the particular video; and
was generated based on the metadata associated with the particular process depicted in the particular video.

15. A non-transitory computer-readable medium comprising instructions that, when executed by a hardware processor, cause the processor to:
record a set of videos, each video of the set of videos associated with an application of a set of applications and depicting a process performed using the application;
for each video of the set of videos:
generate metadata associated with the process depicted in the video; and
store the metadata within a collection of metadata;
receive a request for information from a user;
determine an estimate of a wait time to generate a response to the request to the user; and
in response to receiving the request for the information:
in conjunction with transmitting the estimate of the wait time to the user, identify an application of the set of applications for use in generating the response to the request, wherein the application is not associated with an available application programming interface (API);
generate, based on the collection of metadata, instructions for interfacing with the application to generate the response to the request;
execute the instructions to interface with the application to generate the response to the request; and
transmit the response to the user.

16. The non-transitory computer-readable medium of claim 15, wherein:
in response to receiving the request for information, the instructions, when executed by the hardware processor, further cause the processor to:
store the request for information at an end of a queue; and
monitor a position of the request within the queue; and
generating the response to the request is performed in response to determining that the request is at a top of the queue.

17. The non-transitory computer-readable medium of claim 16, wherein, in response to storing the request for information at the end of the queue, the instructions, when executed by the hardware processor, further cause the processor to:
collect values for a set of parameters associated with a system;
determine, based on the request for the information and the collected values for the set of parameters, the estimate of the wait time to generate the response to the request; and
transmit, to the user, the estimate of the wait time to generate the response to the request.

18. The non-transitory computer-readable medium of claim 17, wherein:
the instructions, when executed by the hardware processor, further cause the processor to train a machine learning algorithm, based on training data, to determine the estimate of the wait time to generate the response to the request, the training data comprising a plurality of historical requests, wherein for each historical request of the plurality of historical requests, the training data further comprises a set of historical parameters associated with the historical request and a historical time taken to respond to the historical request; and
determining the estimate of the wait time to generate the response to the request comprises executing the machine learning algorithm.

19. The non-transitory computer-readable medium of claim 15, wherein the instructions for interfacing with the application comprise at least one of:
a custom API for interfacing with the application; and
a set of headless browser steps for interfacing with the application.

20. The non-transitory computer-readable medium of claim 15, wherein generating the instructions for interfacing with the application comprises executing a machine learning algorithm trained to generate the instructions for interfacing with the application, based on a plurality of sets of instructions stored in a memory, wherein each set of instructions of the plurality of sets of instructions:
is associated with a particular process depicted in a particular video of the set of videos;
comprises instructions for interfacing with the application associated with the particular video; and
was generated based on the metadata associated with the particular process depicted in the particular video.

* * * * *